(12) United States Patent
Lin

(10) Patent No.: US 7,324,082 B2
(45) Date of Patent: Jan. 29, 2008

(54) PORTABLE DATA PROCESSING DEVICE WITH ONE TOUCH CONTROL AND SWITCHING METHOD THEREOF

(75) Inventor: Jih-Fong Lin, Taipei (TW)

(73) Assignee: Inventec Corporation, Taipei (TW)

( * ) Notice: Subject to any disclaimer, the term of this patent is extended or adjusted under 35 U.S.C. 154(b) by 605 days.

(21) Appl. No.: 10/842,573

(22) Filed: May 11, 2004

(65) Prior Publication Data

US 2005/0253819 A1 Nov. 17, 2005

(51) Int. Cl.
*G09G 5/00* (2006.01)

(52) U.S. Cl. .................. 345/156; 345/173; 345/530; 345/968; 379/433; 708/131; 715/700; 715/840

(58) Field of Classification Search ............. 345/156, 345/173, 530, 700, 840, 968; 361/683; 379/433; 708/131; 710/1
See application file for complete search history.

(56) References Cited

U.S. PATENT DOCUMENTS

| | | | |
|---|---|---|---|
| 5,896,471 A * | 4/1999 | Suzuki et al. ............. 382/313 |
| 5,941,648 A * | 8/1999 | Robinson et al. ............. 400/82 |
| 6,658,409 B1 * | 12/2003 | Nomura et al. ............... 707/4 |
| 2002/0071550 A1 * | 6/2002 | Pletikosa ............... 379/433.01 |
| 2002/0186527 A1 * | 12/2002 | Yehudai ..................... 361/683 |
| 2003/0055885 A1 * | 3/2003 | Lin et al. .................... 709/203 |
| 2003/0107598 A1 * | 6/2003 | Yokoyama .................. 345/762 |
| 2004/0177101 A1 * | 9/2004 | Underwood ................ 708/131 |
| 2004/0205255 A1 * | 10/2004 | Joachim ....................... 710/1 |
| 2004/0230851 A1 * | 11/2004 | Chao et al. ................ 713/320 |

* cited by examiner

*Primary Examiner*—Bipin Shalwala
*Assistant Examiner*—Vincent E. Kovalick
(74) *Attorney, Agent, or Firm*—Harness, Dickey & Pierce, P.L.C.

(57) ABSTRACT

A portable data processing device with one touch control and a switching method thereof apply to the portable data processing device with a touch pad and a built-in one touch control official system, and users can directly press the key on the touch pad to execute the corresponding application program or function.

3 Claims, 4 Drawing Sheets

| 1、File | 2、Survey | 3、Play |
|---|---|---|
| 4、My Favorite | 5、Broadcast | 6、Music |
| 8、Volume | 8、Move To | 9、Multimedia |
| Esc / Switch | 0、Description | Enter |

FIG.3

PORTABLE DATA PROCESSING DEVICE WITH ONE TOUCH CONTROL AND SWITCHING METHOD THEREOF

BACKGROUND OF THE INVENTION

1. Field of Invention

The present invention relates to a portable data processing device with one touch control and a switching method thereof, and applies to a portable data processing device with a built-in one touch control official system.

2. Related Art

Software and hardware of the computers have developed continually to correspond with the evolution of the cyber technology, and many software systems have developed to have extremely modern and complicated functions.

But the novelty and the complicacy of the software may cause the users without enough knowledge about computers difficulties in studying and using the software, for a novice usually has problems in searching and executing the functions he desires among lots of ones. And lots of try-and-error decreases users' interest in operating computers.

Therefore, in order to ensure users being able to execute a specific application program of an official system or a specific function of an application program, an official system with one touch executing application programs or functions has been developed and users can execute the desired program or function by only pressing one set number key, each key corresponding to a specific function or program of the official system, so that users can effectively operate the computers.

The number keys are usually sited on the top position of the keyboard of the note book, and arranged from left to right according to the magnitude with each key used not only to input number signals but also to input symbol signals such as !, @, #, $ so as to fully use the space.

However, since the keystrokes are arranged complexly and compactly and each keystroke is similar to another, an elder or a novice may have difficulties in using the one touch control official system, so that the one touch control official system fails to simplify the operating interface of the computers. Originally, the concept of the one touch control official system is similar to the concept of the keystrokes of the telephone so as to facilitate a novice's operation of computers.

SUMMARY OF THE INVENTION

Accordingly, the object of the present invention is to provide a portable data processing device with a one touch control and a switching method thereof, wherein a touch pad of the portable data processing device displays and executes the keys and the corresponding application programs or functions of the one touch control official system so as to integrate all the number keys originally sited on the top position of the keyboard into the touch pad, so that a novice or an elder can easily operate the device for the interface of the one touch control official system similar to the arrangement of the number keys of the telephone.

The portable data processing device with one touch control of the present invention mainly includes a receiving module, a switching module, a display module, and a signal output module.

Firstly, the receiving module is connected to the touch pad of the portable data processing device for receiving the switching signal inputted in the touch pad to switch the touch pad to the one touch control official system.

Secondly, the switching module actuates the one touch control official system of the portable data processing device according to the switching signal received by the receiving module. When users input the switching signal through the touch pad to actuate the one touch control official system, a display module displays at least one key and the corresponding application program or function in the different areas of the touch pad, so that users can choose the function they desired.

Finally, when users press the touch pad to execute the program or the function they want, the signal output module receives an actuation signal produced by users pressing a certain area of the touch pad to execute the program or the function corresponding to the pressed key, and the display module simultaneously renews the display of the touch pad to exhibit the keys and the corresponding function options of the subdirectory.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus doesn't limit the present invention, wherein:

FIG. 3 illustrates a display of the touch pad renewed by a display module.

DETAILED DESCRIPTION OF THE INVENTION

The portable data processing device with one touch control of the present invention applies to a portable data processing device, such as a note book computer or a PDA, with a touch pad, and the portable data processing device has a built-in one touch control official system so as to facilitate users to execute an application program or a function by one touch.

Currently, the touch pad of the portable data processing device is functioned as a mouse, wherein users move their fingers on the touch pad to move the cursor to the desired position.

The touch pad of the present invention not only is functioned as a mouse, but also receives and displays one touch inputs to execute application programs or functions as receiving a switching signal from users so as to simplify the operation and the display of the one touch control official system and to facilitate a novice and an elder.

Figure 1:
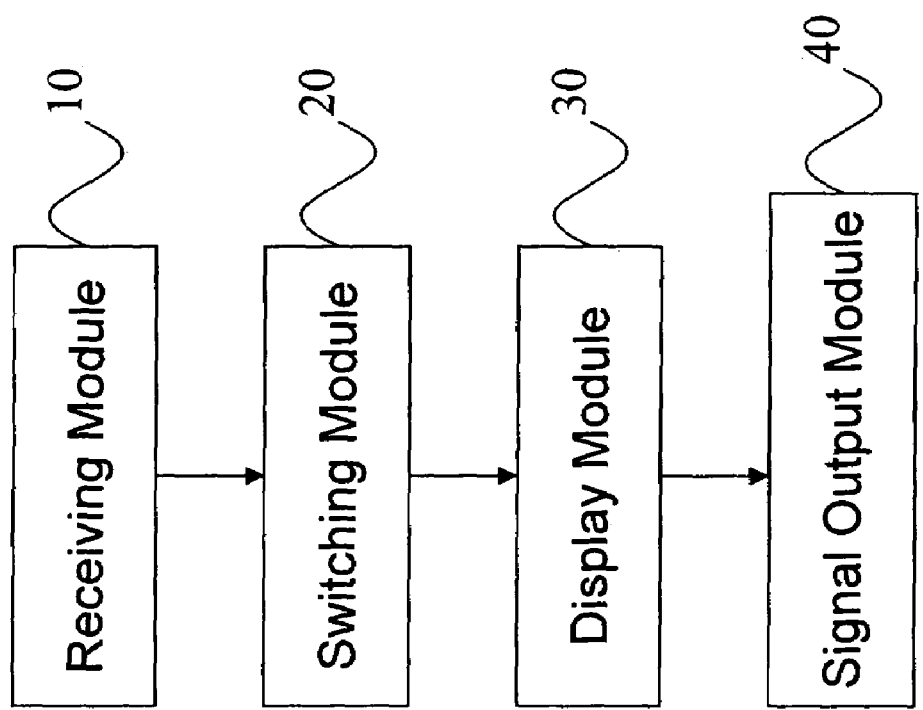
FIG. 1 illustrates a system structure of a portable data processing device with one touch control of the present invention.

Please refer to FIG. 1 illustrating a system structure of a portable data processing device with one touch control of the present invention, which mainly includes a receiving module 10, a switching module 20, a display module 30, and a signal output module 40.

The receiving module 10 is connected to the touch pad of the portable data processing device. The touch pad is functioned as a mouse, and users move their fingers thereon to move the cursor to the desired position and press ENTER on the keyboard to execute the desired program or function. As users want to display each key and the corresponding options of the application program or function of the one touch control official system, they can input a switching signal through a specific area of the touch pad (such as pressing the lower-left corner of the touch pad for three seconds continually) in the receiving module 10.

Afterwards, the switching module 20 actuates the one touch control official system of the portable data processing device according to the switching signal received by the receiving module 10, so that users can execute application programs or functions by pressing different areas displaying each key.

When users input a switching signal through the touch pad to actuate the one touch control official system, the display module 30 displays at least one key and the corresponding program or function, so that users can choose the program or function they want.

Figure 2:
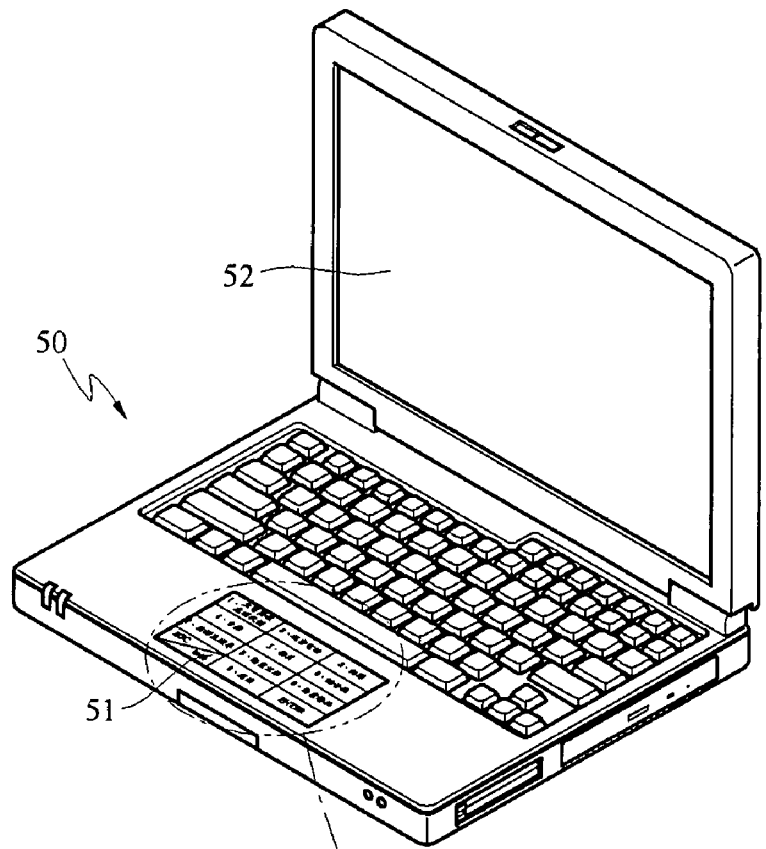
FIG. 2 illustrates a note book with a touch pad switched to display the one touch control official system.
Figure 2:
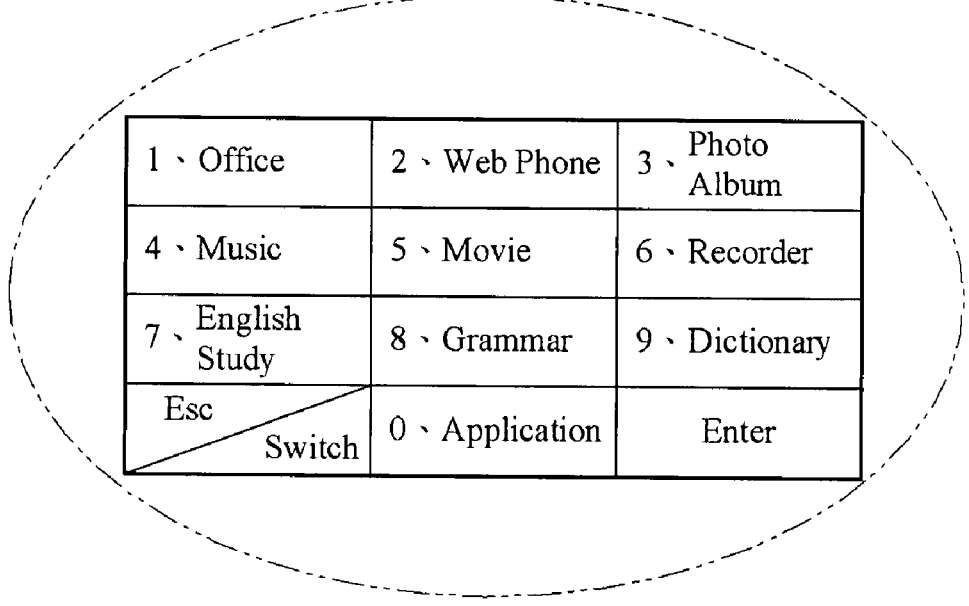

FIG. 2 illustrates a note book computer 50 with a screen 52 and a touch pad 51 switched to display the one touch control official system. The touch pad 51 displays each key, number key 1~9, and each corresponding application program, such as number key 1 for the official software, number key 2 for the web phone, number key 3 for the photo album, number key 4 for the music, etc., and users can choose the program or function they want. The arrangement of the keys of the one touch control official system is similar to the arrangement of the number keys of the telephone, and thereby a novice or an elder can easily operate the computers.

When users press a certain area of the touch pad 51 to actuate the desired program or function, the signal output module 40 receives the actuation signal to execute the corresponding program or the function, and the display module 30 simultaneously renews the display of the touch pad 51 to exhibit the keys and the corresponding function options of the subdirectory.

We take the touch pad 5 in FIG. 2 as a preferred embodiment. When users choose and execute "5-film", the display module 30 renews the display of the touch pad 51 as shown in FIG. 3 to exhibit the options of the functions of the subdirectory, such as 1-file, 2-survey, 3-play etc. to be chosen.

Users can press SWITCH on the touch pad 51 as shown in FIG. 2 or in FIG. 3 to return to the mouse function from the one touch control official system.

Figure 4:
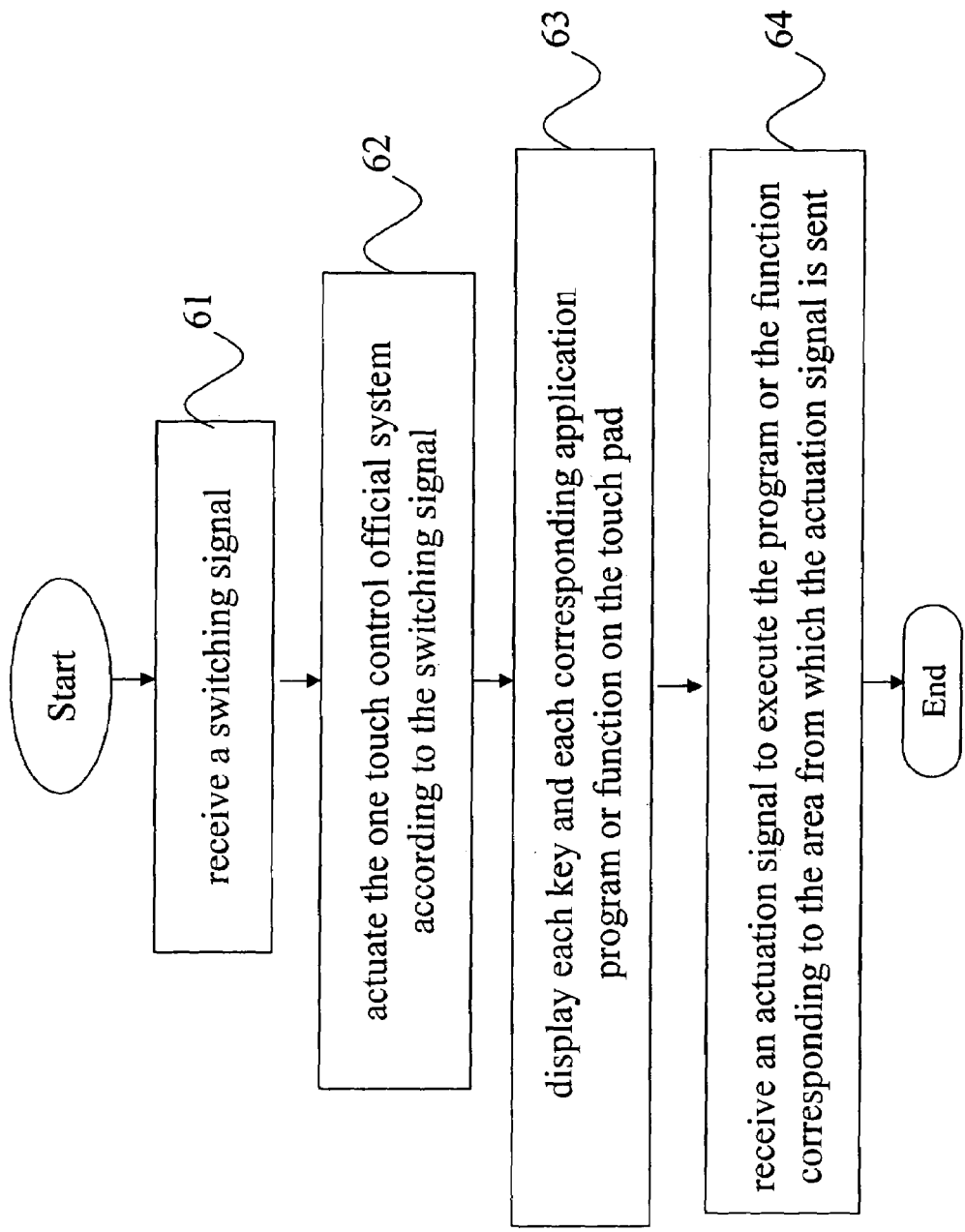
FIG. 4 shows a flow chart illustrating a switching method of a portable data processing device with one touch control.

FIG. 4 is a flow chart illustrating a switching method of a portable data processing device with one touch control, and the system structure mentioned in the flow chart is shown in FIG. 1.

Firstly, receive a switching signal (step 61). Users input a switching signal received by the receiving module 10 through the touch pad to display keys and the corresponding programs or functions of the one touch control official system on the touch pad.

Secondly, actuate the one touch control official system according to the switching signal (step 62). The switching module 20 actuates the one touch control official system of the portable data processing device according to the switching signal received by the receiving module 10.

Thirdly, display each key and each corresponding application program or function on the touch pad (step 63). In the one touch control official system, the display module 30 displays at least one key and the corresponding program or function in the different areas of the touch pad, so that users can choose the program or function they want.

Finally, receive an actuation signal to execute the program or the function corresponding to the area from which the actuation signal is sent (step 64). The signal output module 40 receives an actuation signal produced by users pressing a certain area of the touch pad 51 to execute the program or function corresponding to the pressed key.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A note book computer with one touch control, applying to a note book computer with a touch pad and a screen, the note book computer having a built-in one touch control official system and the touch pad for one touch input, and comprising:
   a receiving module connected to the touch pad for receiving a switching signal inputted to the touch pad;
   a switching module for actuating the one touch control official system according to the switching signal;
   a display module for displaying at least one key and the corresponding application program or function on different areas of the touch pad as the one touch control official system being actuated; and
   a signal output module for receiving an actuation signal produced by users pressing the touch pad to execute the program or the function corresponding to the pressed area of the touch pad with the display module simultaneously renewing the display of the touch pad to exhibit the keys and the corresponding options of the functions of the subdirectory.

2. The note book computer according to claim 1, wherein the touch pad is functioned as a mouse before the signal output module receives the actuation signal.

3. A switching method for a note book computer with one touch control, applying to a note book computer with a screen and a touch pad, the note book computer having a built-in one touch control official system and the touch pad for one touch input, and comprising:
   receiving a switching signal; actuating the one touch control official system according to the switching signal;
   displaying at least one key and the corresponding application program or function on the touch pad; and
   receiving an actuation signal to execute the program or the function corresponding to the area from which the actuation signal is sent, simultaneously renewing the display of the touch pad to exhibit the keys and the corresponding options of the functions of the subdirectory.

* * * * *